US010722766B1

(12) United States Patent
Gonczi et al.

(10) Patent No.: US 10,722,766 B1
(45) Date of Patent: Jul. 28, 2020

(54) COMPOSITE MATERIALS FOR GOLF CLUB HEADS

(71) Applicant: Callaway Golf Company, Carlsbad, CA (US)

(72) Inventors: Robert S. Gonczi, Oceanside, CA (US); Brian J. Webb, Hemet, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 16/510,738

(22) Filed: Jul. 12, 2019

Related U.S. Application Data

(60) Provisional application No. 62/698,483, filed on Jul. 16, 2018.

(51) Int. Cl.
*A63B 53/04* (2015.01)
*B29D 22/00* (2006.01)
*B29K 307/04* (2006.01)

(52) U.S. Cl.
CPC .......... *A63B 53/0466* (2013.01); *B29D 22/00* (2013.01); *A63B 2053/0437* (2013.01); *A63B 2209/023* (2013.01); *A63B 2209/10* (2013.01); *B29K 2307/04* (2013.01)

(58) Field of Classification Search
CPC .......... A63B 53/0466; A63B 2209/023; A63B 2053/0437; A63B 2209/10; B29D 22/00; B29K 2307/04
See application file for complete search history.

(56) References Cited

U.S. PATENT DOCUMENTS

| | | | | |
|---|---|---|---|---|
| 5,779,560 A | * | 7/1998 | Buck | A63B 53/04 473/342 |
| 5,906,550 A | * | 5/1999 | Kingston | B32B 5/26 473/320 |
| 6,723,279 B1 | * | 4/2004 | Withers | A63B 53/04 419/27 |
| 7,115,050 B2 | * | 10/2006 | Andre | A63B 60/00 473/378 |
| 9,504,883 B2 | * | 11/2016 | DeMille | A63B 53/0466 |
| 2005/0096154 A1 | * | 5/2005 | Chen | A63B 53/0466 473/345 |
| 2016/0045792 A1 | * | 2/2016 | Ines | A63B 53/04 473/349 |
| 2019/0002617 A1 | * | 1/2019 | Kotani | C08F 8/26 |

* cited by examiner

*Primary Examiner* — Stephen L Blau
(74) *Attorney, Agent, or Firm* — Rebecca Hanovice; Michael Catania; Sonia Lari

(57) ABSTRACT

A multiple-material golf club head with a resilient crown structure and an improved, graphene-infused coating is disclosed herein. The crown comprises a metal support structure that is attached to the body of the golf club head and supports a composite outer layer. The golf club head is also at least partially coated with a paint film that is infused with graphene particles.

1 Claim, 3 Drawing Sheets

COMPOSITE MATERIALS FOR GOLF CLUB HEADS

CROSS REFERENCES TO RELATED APPLICATIONS

The present application claims priority to U.S. Provisional Patent Application No. 62/698,483, filed on Jul. 16, 2018, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to golf club heads comprising novel composite materials. More specifically, the invention is directed to a golf club head that incorporates hybrid laminate material in a crown region and includes one or more graphene-infused protective coatings.

Description of the Related Art

In recent years, golf club manufacturers have incorporated composite laminates into golf club crowns to reduce overall club mass and lower center of gravity. These laminates typically include one or more layers or plies of carbon fiber in a resin matrix that are molded or cured in a heated tool under pressure, and then subsequently are finished by being sanded and painted.

Carbon is susceptible to damage due to grinding, however, especially when provided in the form of a relatively thin laminate. The sanding process can damage the fibers in the laminate, thereby weakening the structure, and result in a reduced crown thickness that violates USGA crown rigidity requirements. These rigidity constraints can hamper manufacturer efforts to create aggressively flat crown curvatures with similar thicknesses and weight.

Therefore, there is a need for improved composite crown structures and coating materials that allow manufacturers to comply with USGA restraints and produce composite crowns that are stronger, thinner, and more robust than existing golf club crown designs.

BRIEF SUMMARY OF THE INVENTION

One aspect of the present invention is a crown that is stronger, lighter, and more robust than existing crown designs from a processing standpoint. The inventive crown includes flatter curvatures than existing designs without failing USGA rigidity requirements.

Another aspect of the present invention is a composite crown with fiber-reinforced laminates supported by a backing structure comprising a metallic material with isotropic properties. This backing structure supports the fibers during finishing processes and allows for flatter crown geometries that conform to USGA requirements.

Yet another aspect of the present invention is a coating material for golf club heads that includes graphene particles, which improve the aging properties, abrasion resistance, and durability of the coating and golf club head.

Another aspect of the present invention is a golf club head comprising a body with an opening encircled by a bond flange, and a cover piece comprising a composite layer and a metal support structure, wherein the composite layer is affixed to the metal support structure, wherein the metal support structure has a thickness of 0.0005 inch to 0.0300 inch, and wherein the metal support structure is affixed to the bond flange to enclose the opening. In some embodiments, the composite layer may be affixed to an exterior surface of the metal support structure with an adhesive. In other embodiments, the composite layer may be co-molded with the metal support structure. In still other embodiments, the composite layer may comprise at least one ply of carbon fiber reinforced composite, and the metal support structure may be composed of a metal alloy selected from the group consisting of titanium alloy, magnesium alloy, and aluminum alloy. In a further embodiment, the golf club head may comprise at least one layer of a graphene-infused coating, which may cover at least a portion of an external surface of the cover piece. In a further embodiment, the coating may comprise paint film and up to 10% of graphene particles based on dry weight, and more preferably no more than 5% of graphene particles based on dry weight. In an alternative embodiment, the coating may further comprise at least one of a material selected from the group consisting of graphene oxide, carbon nanotubes, and boron nitride. In any of these embodiments, wherein the coating may comprise pigmentation.

Yet another aspect of the present invention is a golf club head comprising a body comprising an upper opening encircled by a bond flange, a crown comprising a composite layer, an adhesive layer, and a metal support structure, and a graphene-infused coating layer, wherein the composite layer comprises at least one ply of carbon fibers and a resin material, wherein the metal support structure has a thickness of no more than 0.030 inch and is composed of a metal alloy selected from the group consisting of titanium alloy, magnesium alloy, and aluminum alloy, wherein the crown is bonded to an upper surface of the metal support structure with the adhesive layer, wherein a lower surface of the metal support structure is affixed to the bond flange to cover the upper opening, wherein the coating layer comprises a paint film and no more than 5% of graphene particles based on dry weight, and wherein the coating layer covers at least a portion of the composite layer of the crown. In some embodiments, the composite layer may further comprise at least one material selected from the group consisting of aramid fibers and glass fibers. In other embodiments, the coating may further comprise at least one of a material selected from the group consisting of graphene oxide, carbon nanotubes, and boron nitride. In any of these embodiments, the golf club head may be a wood-type golf club head.

Another aspect of the present invention is a method comprising the steps of providing a golf club head body comprising a bond flange, providing a carbon composite layer with an upper surface and a lower surface, spray depositing a metal alloy in a tool to create a metal support structure having a thickness of 0.0005 inch to 0.0300 inch, affixing the metal support structure to the lower surface of the carbon composite layer, preparing an inner mold line of the metal support structure for bonding by mechanical or chemical means, applying an adhesive material to an external surface of the bond flange or the inner mold line of the metal support structure, bonding the inner mold line of metal support structure to the bond flange to create a golf club head assembly, and curing at least a portion of the golf club head assembly. The method may comprise a further step of coating at least a portion of the golf club head assembly with a graphene-infused coating, and this step may occur after the bonding step and before the curing step. In some embodiments, the coating step may comprise applying multiple layers of the graphene-infused coating to the golf club assembly. In other embodiments, the coating step may comprise applying the graphene-infused coating via a process selected from the group consisting of spray and dipping. In any of the embodiments, the curing step may comprise heating the golf club assembly at one or more temperatures no higher than 170° C.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention introduces a solution to the problems set forth above by providing a composite crown with a metallic support structure and graphene-infused coatings to protect the structural integrity of the crown and other portions of the golf club body. The materials and structures are disclosed herein in connection with a driver-type golf club head, but can be used with any type of golf club head, including putters, irons, hybrids, and woods.

Figure 1:
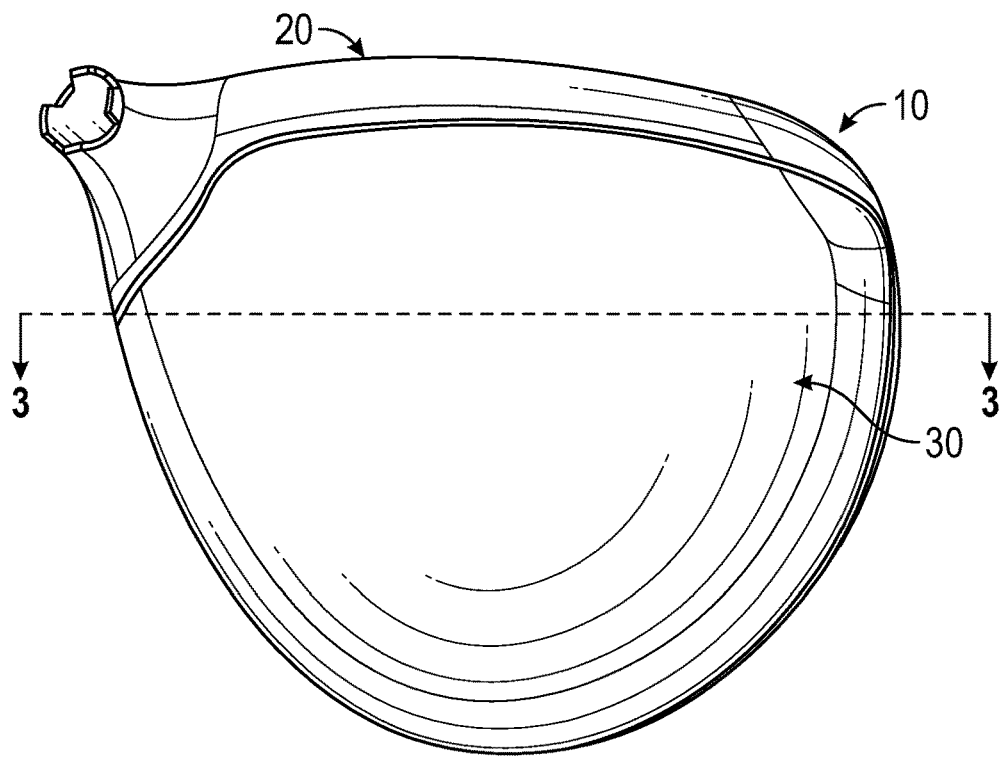
FIG. 1 is a top plan view of a golf club head of the present invention.
Figure 2:
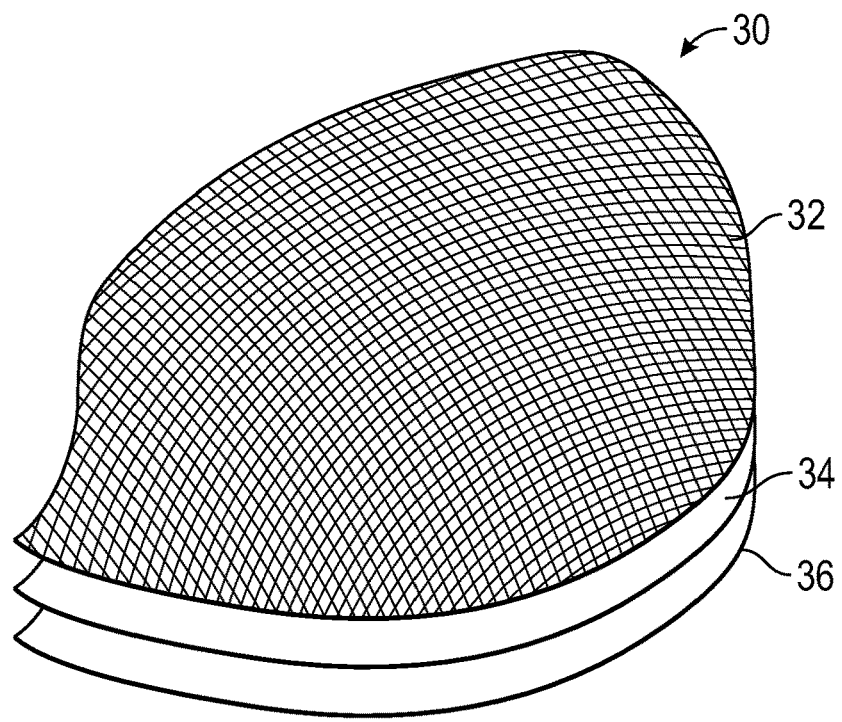
FIG. 2 is an exploded view of the crown portion of the golf club head shown in FIG. 1.
Figure 3:
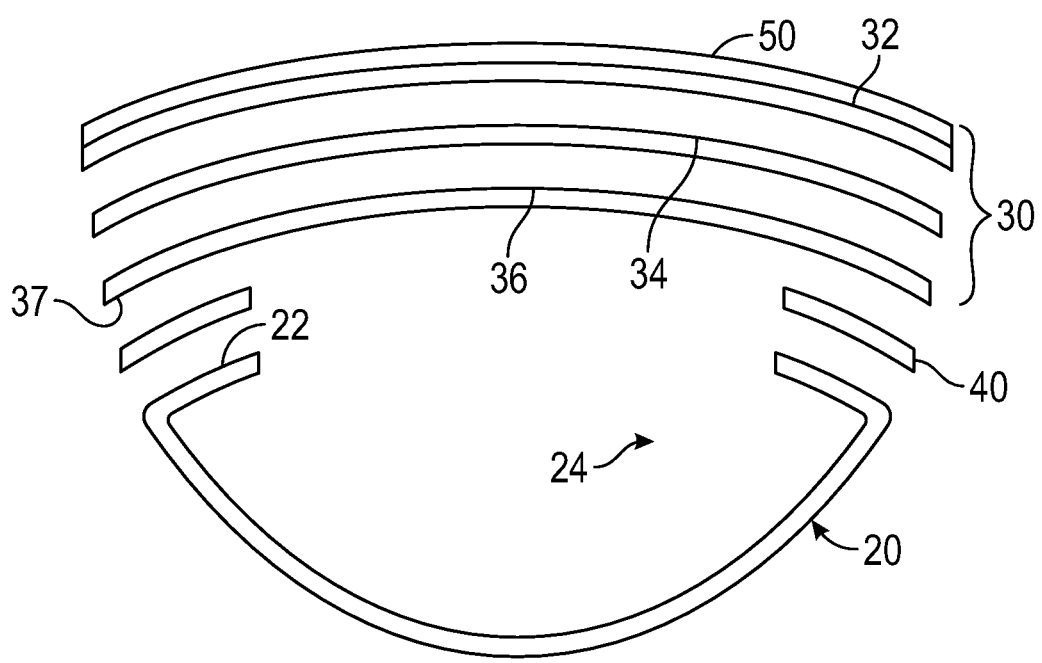
FIG. 3 is a cross-sectional, exploded view of the embodiment shown in FIG. 1 taken along lines 3-3.

A preferred embodiment of the present invention is shown in FIGS. 1-3. The golf club head 10 comprises a body 20 with a bond flange 22 encircling an upper opening 24 and a crown 30 sized to abut the bond flange 22 and cover the upper opening 24. The crown comprises a composite layer 32, an adhesive 34, and a metal support structure 36. The composite layer 32 preferably is the uppermost layer, the metal support structure 36 is the lowermost layer, and the adhesive 34 is sandwiched between them.

The metal structure 36 is a shell, sheet, or film that is formed or spray deposited in a tool to have a thickness of 0.0005" to 0.0300". The metal material used to create the metal structure 36 may be selected from any number of alloys, including, but not limited to those in the titanium, aluminum, and magnesium families. This metal structure 36 is attached with the adhesive 34 to the composite layer 32, which preferably comprises at least one ply of fiber reinforced composite. The fiber in the composite layer 32 can include, but is not limited to carbon, aramid, or glass. In an alternative embodiment, the metal structure 36 is co-molded in a tool with the composite layer 32 and the native or liquid resin. The metal structure 36 may also be secondarily bonded to the inner mold line (IML) of a cured composite crown (not shown) with the adhesive 34.

Once the metal structure 36 is affixed to the composite layer 32, the IML 37 of the metal structure 36 is prepared for bonding to the bond flange 22 by mechanical or chemical means. A film or liquid adhesive 40 is applied to an external surface of the bond flange 22 and/or the IML 37 of the metal structure 36 of the crown 30. The crown 30 is then affixed to the body 20, and the assembly is cured.

After 30 the crown is affixed to the body 20, and before or after curing, at least a portion of the golf club head 10 is coated with a graphene coating 50. Graphene is 100 times stronger than steel, and is 50% electrically and 10 times thermally more conductive than copper. It also has one of the best-known gas barrier properties.

The coating 50 is created by infusing paint film with up to 5% of graphene particles based on dry weight. Graphene particles may be added to the coating 50 in dry form, or can be pre-dispersed in solvent before being added to the paint film. The coating 50 can also include (or substitute the graphene particles with) graphene oxide, multi walled carbon nanotubes, boron nitride, and/or any combination of the above in order to achieve desired coating characteristics.

This coating 50 is based on polyurethane chemistry cured with polyisocyanate-based hardeners, waterborne, epoxy or 1K Polyester Baking Enamel. The coating 50 can be one- or two-part solvent based, and can be applied in single or multiple layers. If used in multiple layers, one or more layers can contain graphene. The coating 50 can be clear or pigmented. Although polyurethane chemistry is more common, coatings based on epoxy amine and moisture cure can also be used. The coating 50 can also be non-reactive where a non-reactive polymer, graphene, and solvent are pre-dispersed before application on golf heads.

The coating 50 is applied to the golf club head 10 via a spray or dipping process, and then cured at temperatures ranging from room temperature to 170° C. The inventive coating 50 improves the abrasion resistance, impact resistance, durability, and barrier properties of the golf head to which it is applied.

Figure 4:
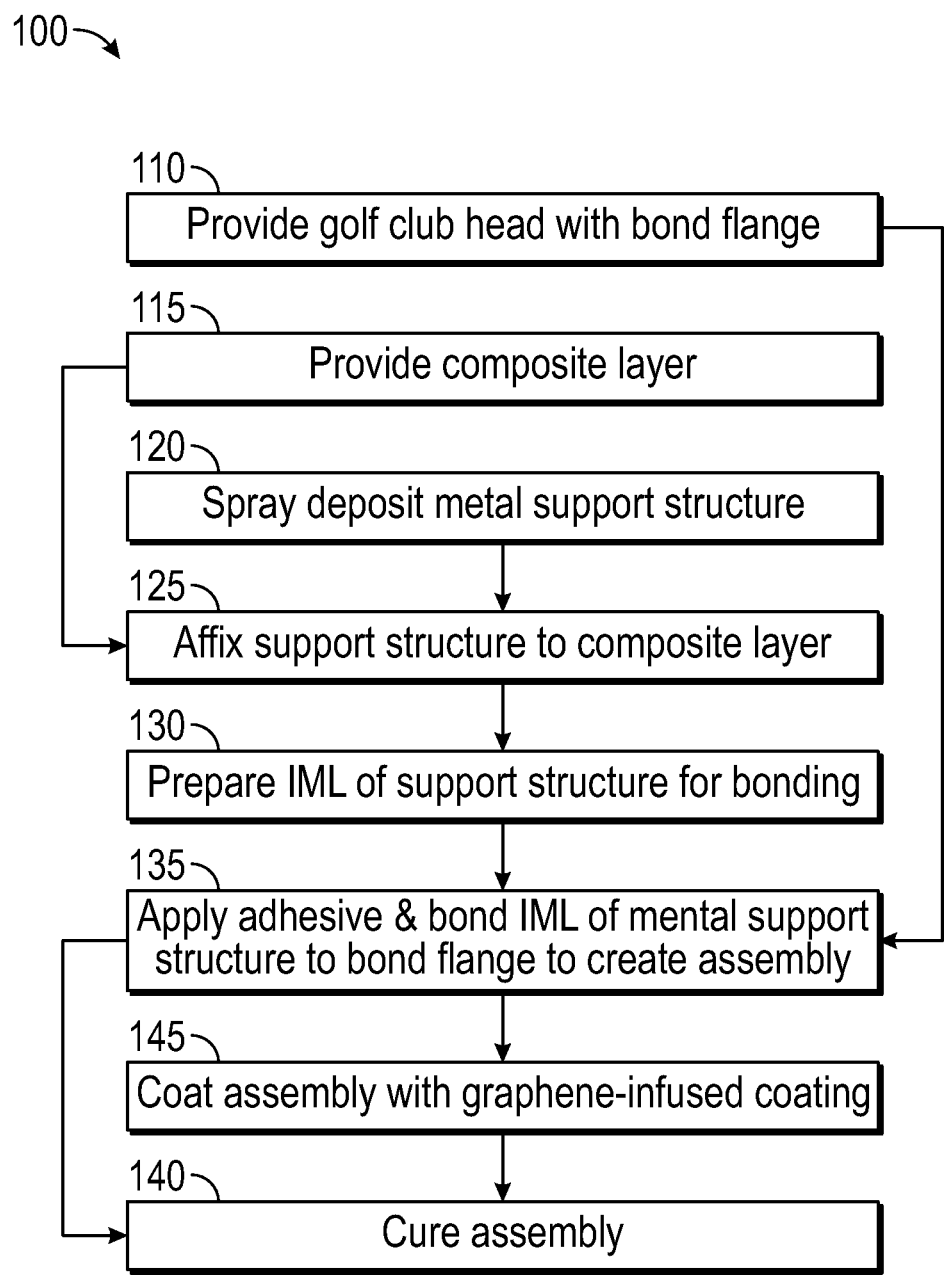
FIG. 4 is a flow chart illustrating a preferred method of making the golf club head of the present invention.

A preferred method 100 of manufacturing the inventive golf club head 10 is illustrated in FIG. 4. This method 100 comprises the steps of providing a golf club head body with a bond flange 110, providing a composite layer 115 with an upper surface and a lower surface, spray depositing a metal alloy in a tool to create a metal support structure 120 having a thickness of 0.0005 inch to 0.0300 inch, affixing the metal support structure to the lower surface of the composite layer 125, preparing an inner mold line of the metal support structure for bonding 130 by mechanical or chemical means, applying an adhesive material and bonding the inner mold line of metal support structure to the bond flange to create a golf club head assembly 135, and curing at least a portion of the golf club head assembly 140. The method 100 may comprise a further step of coating at least a portion of the golf club head assembly with a graphene-infused coating 145, and this step may occur after the bonding step 135 and before the curing step 140. In some embodiments, the coating step 145 may comprise applying multiple layers of the graphene-infused coating to the golf club assembly.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim:

1. A wood-type golf club head comprising:
    a body comprising an upper opening encircled by a bond flange;
    a crown comprising a composite layer, an adhesive layer, and a metal support structure; and
    a plurality of clear, graphene-infused coating layers comprising boron nitride,
    wherein the composite layer comprises at least one ply of carbon fibers and a resin material,
    wherein the metal support structure has a thickness of no more than 0.030 inch and is composed of a metal alloy selected from the group consisting of titanium alloy, magnesium alloy, and aluminum alloy,
    wherein the crown is bonded to an upper surface of the metal support structure with the adhesive layer,
    wherein a lower surface of the metal support structure is affixed to the bond flange to cover the upper opening,
    wherein the coating layer comprises a paint film and no more than 5% of graphene particles based on dry weight, and
    wherein the coating layer covers at least a portion of the composite layer of the crown.

* * * * *